(12) United States Patent
Yoshii et al.

(10) Patent No.: US 7,062,295 B2
(45) Date of Patent: Jun. 13, 2006

(54) RADIO COMMUNICATION SYSTEM AND SCHEDULING METHOD

(75) Inventors: Isamu Yoshii, Urayasu (JP); Mitsuru Uesugi, Yokosuka (JP); Toshiyuki Uehara, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 204 days.

(21) Appl. No.: 10/488,771

(22) PCT Filed: Jun. 13, 2003

(86) PCT No.: PCT/JP03/07535

§ 371 (c)(1),
(2), (4) Date: Mar. 5, 2004

(87) PCT Pub. No.: WO04/002020

PCT Pub. Date: Dec. 31, 2003

(65) Prior Publication Data

US 2004/0248618 A1 Dec. 9, 2004

(30) Foreign Application Priority Data

Jun. 20, 2002 (JP) .............................. 2002-179818

(51) Int. Cl.
*H04M 1/00* (2006.01)
(52) U.S. Cl. ................. 455/562.1; 455/561; 455/452.1
(58) Field of Classification Search ................. 455/434, 455/428, 450, 522, 68, 439, 436, 562.1, 550.1, 455/452.1, 561; 370/252, 335, 342, 347, 370/328, 389, 431
See application file for complete search history.

(56) References Cited

U.S. PATENT DOCUMENTS 6,069,884 A * 5/2000 Hayashi et al. ............. 370/335
2001/0053143 A1 12/2001 Li et al.
(Continued)

FOREIGN PATENT DOCUMENTS

EP 1 1 17192 A1 7/2001
(Continued)

OTHER PUBLICATIONS

PCT International Search Report dated Oct. 7, 2003.
(Continued)

*Primary Examiner*—Sonny Trinh
(74) *Attorney, Agent, or Firm*—Stevens, Davis, Miller & Mosher, LLP

(57) ABSTRACT

A radio communication system and scheduling method where, when data are transmitted from a plurality of transmit antennas to respective different mobile station apparatuses, all the mobile station apparatuses precisely receive data addressed thereto. A scheduler (104) performs scheduling that determines a data transmit order, depending on the numbers of receive antennas of the respective mobile station apparatuses, and notifies a transmit antennas assignment signal generator (124) of which transmit antenna is assigned which mobile station apparatus's sub-stream as the scheduling result. A number of receive antennas notifying signal decoder (122) decodes the number of receive antennas notifying signals and notifies the number of the receive antennas of each mobile station apparatus to the scheduler (104). The transmit antennas assignment signal generator (124) generates the transmit antennas assignment signal indicating which transmit antenna is assigned which mobile station apparatus's sub-stream.

12 Claims, 13 Drawing Sheets

U.S. PATENT DOCUMENTS

| | | | |
|---|---|---|---|
| 2002/0159431 A1* | 10/2002 | Moulsley et al. | 370/347 |
| 2002/0193146 A1* | 12/2002 | Wallace et al. | 455/562 |
| 2003/0043839 A1* | 3/2003 | Luschi et al. | 370/445 |
| 2003/0045288 A1* | 3/2003 | Luschi et al. | 455/434 |
| 2004/0009755 A1* | 1/2004 | Yoshida | 455/101 |
| 2004/0066754 A1* | 4/2004 | Hottinen | 370/252 |
| 2004/0253955 A1* | 12/2004 | Love et al. | 455/442 |
| 2004/0266471 A1* | 12/2004 | Boariu et al. | 455/522 |
| 2005/0025090 A1* | 2/2005 | Klein et al. | 370/328 |
| 2005/0026616 A1* | 2/2005 | Cavalli et al. | 455/436 |
| 2005/0094603 A1* | 5/2005 | Kim et al. | 370/334 |
| 2005/0174982 A1* | 8/2005 | Uehara et al. | 370/345 |
| 2005/0213543 A1* | 9/2005 | Shimizu et al. | 370/335 |
| 2005/0220065 A1* | 10/2005 | Kim et al. | 370/342 |
| 2005/0250506 A1* | 11/2005 | Beale et al. | 455/452.1 |

FOREIGN PATENT DOCUMENTS

| | | |
|---|---|---|
| JP | 2000 059279 | 2/2000 |
| JP | 2001 505723 | 4/2001 |
| JP | 2001 237751 | 8/2001 |
| JP | 2002 044051 | 2/2002 |
| JP | 2003 249914 | 9/2003 |
| WO | 9 809381 | 3/1998 |

OTHER PUBLICATIONS

3GPP TR25.876 V1.0.1 (Feb. 2002), 3$^{rd}$ Generation Partnership Project; Technical Specification Group Radio Access Network; Multiple-Input Multiple Output Antenna Processing for HSDPA; pp. 1-13, no month listed.

3GPP TR25.848 V4.0.0 (Mar. 2001), 3$^{rd}$ Generation Partnership Project; Technical Specification Group Radio Access Network; Physical layer aspects of UTRA High Speed Downlink Packet Access (Release 4), pp. 1-89, no month listed.

* cited by examiner

|     | t1 | t2 | t3 |
|-----|----|----|----|
| f1  | A1 | B1 | B4 |
| f2  | A2 | C1 | C2 |

TRANSMIT ANTENNA 116-1

|     | t1 | t2 | t3 |
|-----|----|----|----|
| f1  | A1 | B2 | C3 |
| f2  | A2 | B3 | C4 |

TRANSMIT ANTENNA 116-2

FIG.13

RADIO COMMUNICATION SYSTEM AND SCHEDULING METHOD

TECHNICAL FIELD

The present invention relates to a radio communication system and a scheduling method.

BACKGROUND ART

In recent years, for HSDPA (High Speed Downlink Packet Access) which transmits packet data at high speed on a downlink, applying MIMO (Multi Input Multi Output) communication wherein a plurality of transmit antennas transmit respectively different packets of data simultaneously using the same frequency and the same code has been examined in order to further increase transmission speed. When performing the MIMO communication, signals transmitted from the plurality of transmit antennas are received by a mobile station apparatus provided with the same number of, or more, receive antennas as the transmit antennas of the base station apparatus, and a matrix operation is performed on the signals received by the respective receive antennas to separate into packets of data transmitted by the respective plurality of transmit antennas, which are then demodulated and decoded.

In HSDPA having the above MIMO communication applied thereto, when transmitting packets of data to a plurality of mobile station apparatuses, the base station apparatus may transmit packets of data from the plurality of transmit antennas respectively to the different mobile station apparatuses simultaneously. For example, a base station apparatus provided with two transmit antennas may assign one transmit antenna to a mobile station apparatus and the other transmit antenna to another mobile station apparatus, and transmit packets of data simultaneously.

In the case where a base station apparatus assigns a plurality of transmit antennas respectively to different mobile station apparatuses and transmits packets of data simultaneously as described above, if every mobile station apparatus receiving the packets of data has the same number of, or more, receive antennas as the transmit antennas of the base station apparatus, each mobile station apparatus can correctly separate the packets of data transmitted from the respective transmit antennas and demodulate and decode the packet of data addressed thereto.

However, if the number of receive antennas of a mobile station apparatus is less than the number of the transmit antennas of the base station apparatus, the mobile station apparatus cannot correctly separate the packets of data transmitted from the respective transmit antennas, so that packets of data addressed to other apparatuses become an interference component, thus causing the problem that receive quality degrades.

DISCLOSURE OF INVENTION

An object of the present invention is to enable all mobile station apparatuses to precisely receive data addressed thereto when data are transmitted from a plurality of transmit antennas to the respective different mobile station apparatuses.

The subject of the present invention is that each mobile station apparatus notifies the number of receive antennas provided in the mobile station apparatus to a base station apparatus, and the base station apparatus performs scheduling such that all the mobile station apparatuses correctly separate, on a per transmit antenna basis, data transmitted via a plurality of transmit antennas, based on the notified numbers of the receive antennas of the mobile station apparatuses.

According to an embodiment of the present invention, a radio communication system that has a mobile station apparatus group of which at least one mobile station apparatus is provided with a plurality of receive antennas and a base station apparatus that transmits data to the mobile station apparatus group via a plurality of transmit antennas is configured that each mobile station apparatus of the mobile station apparatus group comprises a number of receive antennas notifying signal transmit section that transmits a number of receive antennas notifying signal indicating the number of receive antennas provided for the mobile station apparatus, and that the base station apparatus comprises a number of receive antennas notifying signal receive section that receives the number of receive antennas notifying signals; a transmit order determining section that determines order in which data are transmitted based on the number of receive antennas notifying signals received; and a data transmit section that assigns the data to the plurality of transmit antennas according to the determined transmit order and transmits.

According to another embodiment of the present invention, a base station apparatus that transmits data via a plurality of transmit antennas comprises a number of receive antennas notifying signal receive section that receives number of receive antennas notifying signals indicating the numbers of receive antennas provided for communication partner stations; a transmit order determining section that determines order in which data are transmitted based on the number of receive antennas notifying signals received; and a data transmit section that assigns the data to the plurality of transmit antennas according to the determined transmit order and transmits.

According to yet another embodiment of the present invention, a mobile station apparatus comprises a number of receive antennas notifying signal transmit section that transmits a number of receive antennas notifying signal indicating the number of receive antennas provided for the mobile station apparatus.

According to still another embodiment of the present invention, a scheduling method comprises the steps of acquiring the numbers of receive antennas of communication partner stations; determining order in which data are transmitted based on the acquired numbers of the receive antennas; and assigning the data to a plurality of transmit antennas according to the determined transmit order and transmitting.

BRIEF DESCRIPTION OF THE DRAWINGS

FIG. 13 is a view showing an example of the assignment of data to transmit antennas according to embodiment 3.

BEST MODE FOR CARRYING OUT THE INVENTION

Embodiments of the present invention will be described in detail below with reference to the drawings.

EMBODIMENT 1

Figure 1:
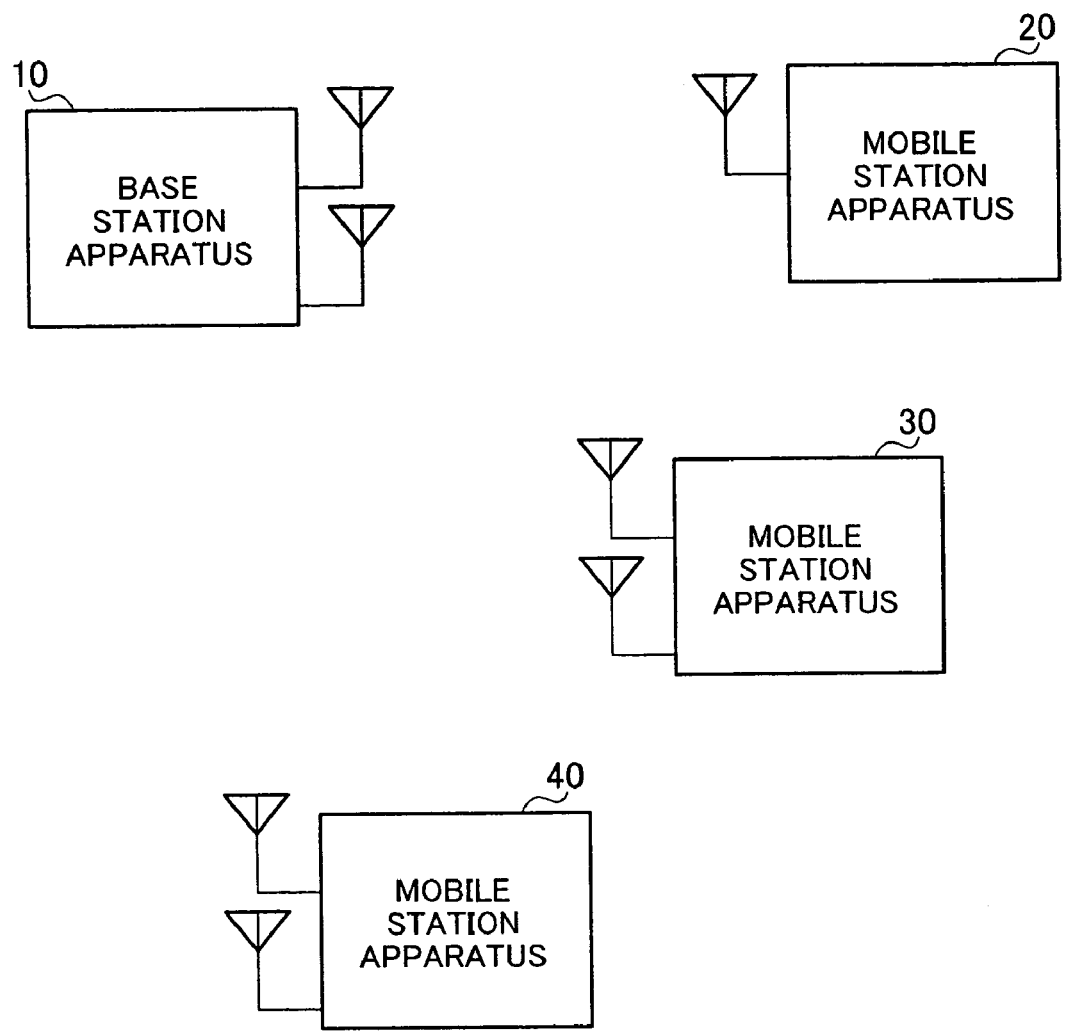
FIG. 1 is a view showing an example of the configuration of a radio communication system according to embodiment 1 of the present invention.

FIG. 1 is a view showing an example of the configuration of a radio communication system according to embodiment 1 of the present invention. The radio communication system shown in FIG. 1 comprises a base station apparatus 10 provided with two transmit antennas, a mobile station apparatus 20 provided with one receive antenna, a mobile station apparatus 30 provided with two receive antennas, and a mobile station apparatus 40 provided with two receive antennas.

It is assumed that the base station apparatus 10 communicates with the mobile station apparatuses 20, 30, and 40.

Figure 2:
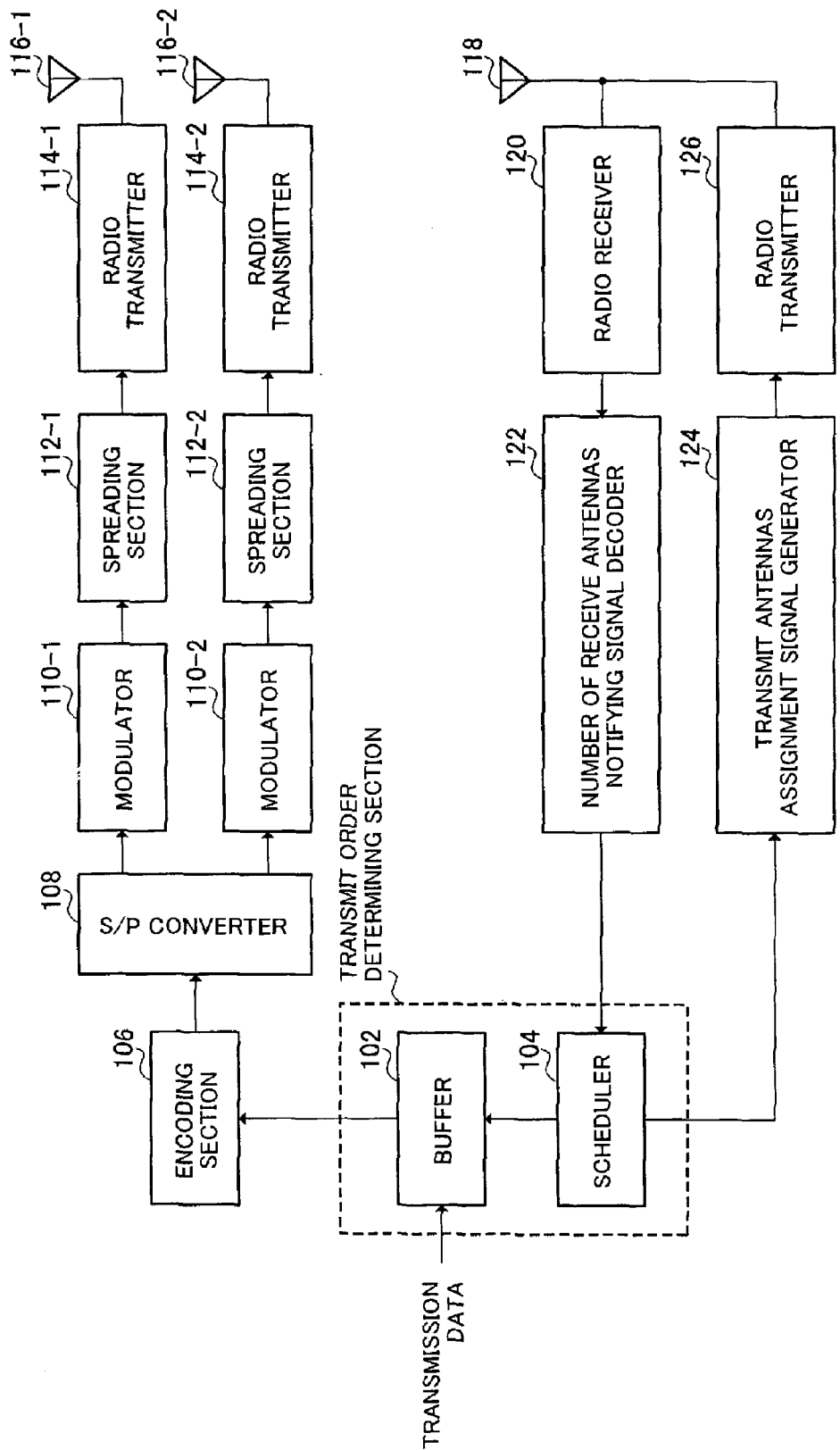
FIG. 2 is a block diagram showing the internal configuration of a base station apparatus according to embodiment 1.

FIG. 2 is a block diagram showing the internal configuration of the base station apparatus 10 according to embodiment 1. The base station apparatus 10 shown in FIG. 2 comprises a transmit order determining section consisting of a buffer 102 and a scheduler 104, an encoding section 106, a S/P (Serial/Parallel) converter 108, modulators 110-1 to 110-2, spreading sections 112-1 to 112-2, radio transmitters 114-1 to 114-2, transmit antennas 116-1 to 116-2, an antenna 118, a radio receiver 120, a number of receive antennas notifying signal decoder 122, a transmit antennas assignment signal generator 124, and a radio transmitter 126. Note that in the description below, the flow of data from the modulator 110-1 to the transmit antennas 116-1 and the flow of data from the modulator 110-2 to the transmit antennas 116-2 are each called "sub-stream".

The buffer 102, according to the scheduling by the scheduler 104, sends out transmission data to the mobile station apparatus 20, 30, or 40. The scheduler 104 performs scheduling to determine a data transmit order, depending on the numbers of the receive antennas of the respective mobile station apparatuses based on respective number of receive antennas notifying signals decoded by the number of receive antennas notifying signal decoder 122. Here, the number of receive antennas notifying signals are signals that are transmitted from the mobile station apparatuses 20, 30, 40 and each notify the number of the receive antennas of the respective mobile station apparatus.

Furthermore, the scheduler 104 notifies the transmit antennas assignment signal generator 124 of which transmit antenna is assigned which mobile station apparatus's sub-stream as the scheduling result. The scheduling by the scheduler 104 will be described later.

The encoding section 106 encodes data sent out from the buffer 102 into error-correction coded data. The S/P converter 108 serial/parallel-converts the error-correction coded data into two sub-streams. The modulators 110-1 and 110-2 modulate the sub-streams respectively. The spreading sections 112-1 and 112-2 spread the sub-streams respectively with the same spreading code. The radio transmitters 114-1 and 114-2 perform predetermined radio processing (D/A conversion, up convert, etc.) on the respective sub-streams, and transmit at the same frequency and at the same time via the corresponding transmit antennas 116-1 and 116-2 respectively.

The antenna 118 receives the number of receive antennas notifying signals transmitted from the mobile station apparatuses 20, 30, and 40 and transmits a transmit antennas assignment signal generated by the transmit antennas assignment signal generator 124. The radio receiver 120 performs predetermined radio processing (down convert, A/D conversion, etc.) on the number of receive antennas notifying signals received. The number of receive antennas notifying signal decoder 122 decodes the number of receive antennas notifying signals and notifies the numbers of the receive antennas of the mobile station apparatuses 20, 30, and 40 to the scheduler 104. The transmit antennas assignment signal generator 124 generates the transmit antennas assignment signal indicating which transmit antenna is assigned which mobile station apparatus's sub-stream. The radio transmitter 126 performs predetermined radio processing (D/A conversion, up convert, etc.) on the transmit antennas assignment signal.

Figure 3:
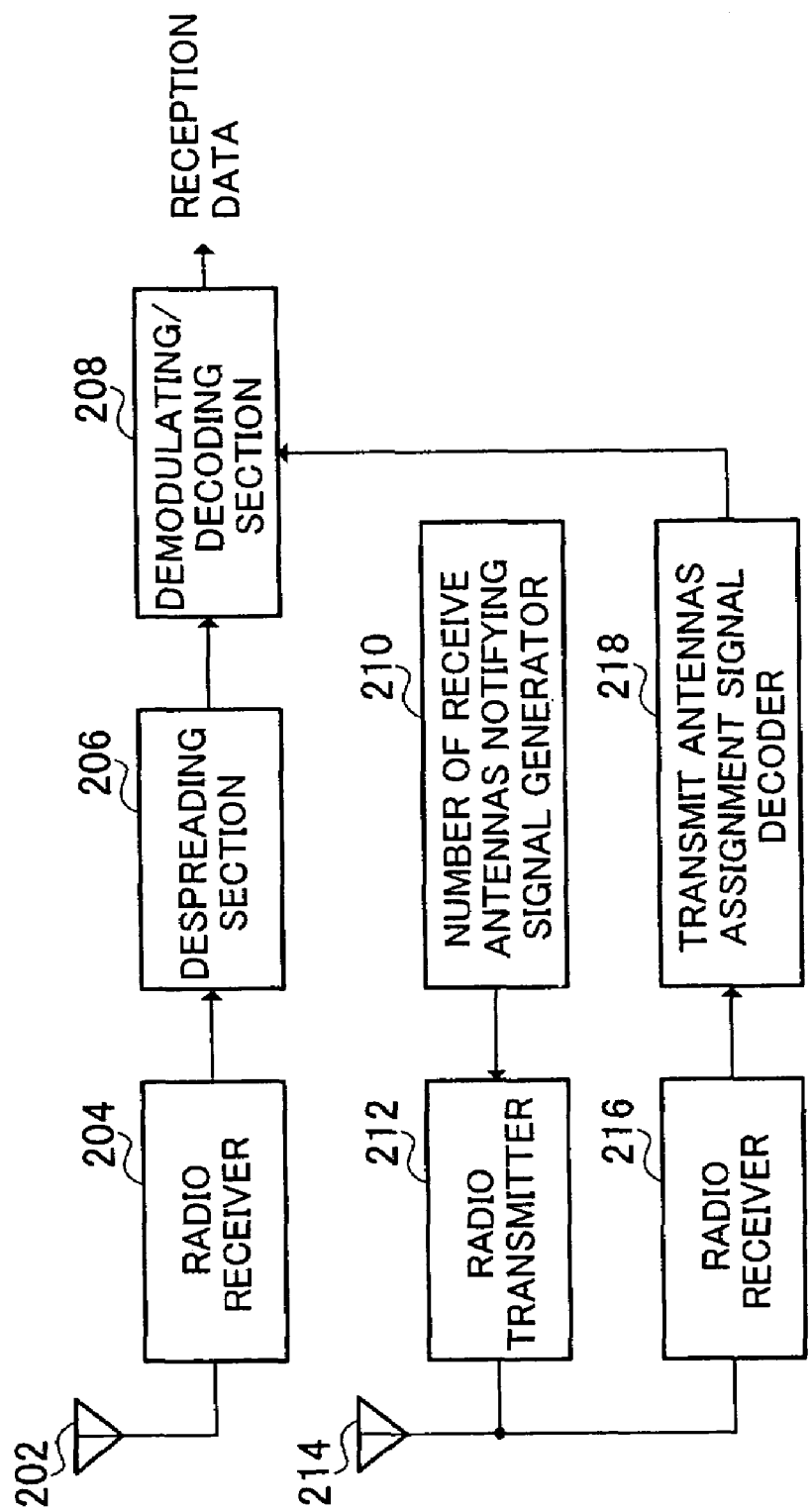
FIG. 3 is a block diagram showing the internal configuration of a mobile station apparatus according to embodiment 1.

FIG. 3 is a block diagram showing the internal configuration of the mobile station apparatus 20 according to embodiment 1. The mobile station apparatus 20 shown in FIG. 3 comprises a receive antenna 202, a radio receiver 204, a despreading section 206, a demodulating/decoding section 208, a number of receive antennas notifying signal generator 210, a radio transmitter 212, an antenna 214, a radio receiver 216, and a transmit antennas assignment signal decoder 218.

The radio receiver 204 receives the signals of the sub-streams transmitted from the base station apparatus 10 via the receive antenna 202 and performs predetermined radio processing (down convert, A/D conversion, etc.). The despreading section 206 despreads the received signals. The demodulating/decoding section 208 demodulates and decodes a sub-stream addressed to its own apparatus from among the sub-streams transmitted from the base station apparatus 10 to obtain reception data.

The number of receive antennas notifying signal generator 210 generates a number of receive antennas notifying signal for notifying the number of the receive antennas (here, one) provided for its own apparatus to the base station apparatus 10. The radio transmitter 212 performs predetermined radio processing (D/A conversion, up convert, etc.) on the number of receive antennas notifying signal and transmits via the antenna 214.

The antenna 214 receives the transmit antennas assignment signal transmitted from the base station apparatus 10 and transmits the number of receive antennas notifying signal generated by the number of receive antennas notifying signal generator 210. The radio receiver 216 performs predetermined radio processing (down convert, A/D conversion, etc.) on the transmit antennas assignment signal received via the antenna 214. The transmit antennas assignment signal decoder 218 decodes the transmit antennas assignment signal and notifies information indicating which transmit antenna of the base station apparatus 10 is assigned which mobile station apparatus's sub-stream to the demodulating/decoding section 208.

Figure 4:
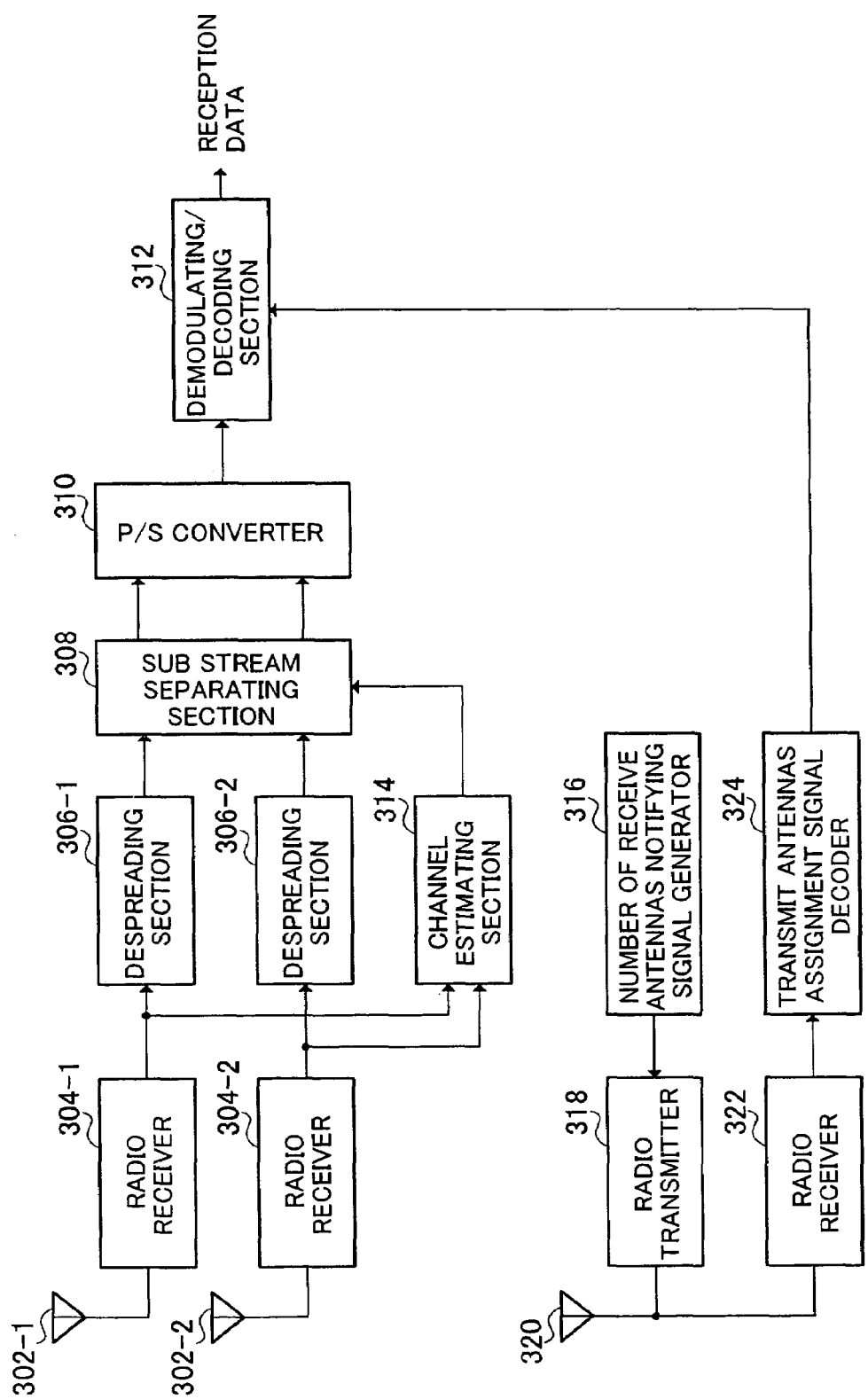
FIG. 4 is a block diagram showing the internal configuration of other mobile station apparatus according to embodiment 1.

FIG. 4 is a block diagram showing the internal configuration of the mobile station apparatus 30 according to embodiment 1. Note that the mobile station apparatus 40 has the same configuration as the mobile station apparatus 30. The mobile station apparatus 30 shown in FIG. 4 comprises receive antennas 302-1 to 302-2, radio receivers 304-1 to 304-2, despreading sections 306-1 to 306-2, a sub-stream separating section 308, a P/S converter 310, a demodulating/decoding section 312, a channel estimating section 314, a number of receive antennas notifying signal generator 316, a radio transmitter 318, an antenna 320, a radio receiver 322, and a transmit antennas assignment signal decoder 324.

The radio receivers 304-1 and 304-2 receive the signals of the sub-streams transmitted from the base station apparatus 10 via the receive antennas 302-1 and 302-2 respectively and perform predetermined radio processing (down convert, A/D conversion, etc.). The despreading sections 306-1 and 306-2 despread the received signals. The sub-stream separating section 308 separates the despread received signals into the respective data of the sub-streams from the base station apparatus 10 based on a channel estimating result. The P/S converter 310 parallel/serial-converts the respective data of the two sub-streams obtained by the separation into a series of data. The demodulating/decoding section 312 demodulates and decodes data corresponding to a sub-stream transmitted to its own apparatus from the base station apparatus 10 out of the series of data to obtain reception data. The channel estimating section 314 performs channel estimation on the signals received by each of the receive antennas 302-1 and 302-2.

The number of receive antennas notifying signal generator 316 generates a number of receive antennas notifying signal for notifying the number of the receive antennas (here, two) provided for its own apparatus to the base station apparatus 10. The radio transmitter 318 performs predetermined radio processing (D/A conversion, up convert, etc.) on the number of receive antennas notifying signal and transmits via the antenna 320.

The antenna 320 receives the transmit antennas assignment signal transmitted from the base station apparatus 10 and transmits the number of receive antennas notifying signal generated by the number of receive antennas notifying signal generator 316. The radio receiver 322 performs predetermined radio processing (down convert, A/D conversion, etc.) on the transmit antennas assignment signal received via the antenna 320. The transmit antennas assignment signal decoder 324 decodes the transmit antennas assignment signal radio-processed and notifies information indicating which transmit antenna of the base station apparatus 10 is assigned which mobile station apparatus's sub-stream to the demodulating/decoding section 312.

Next, in the radio communication system including the base station apparatus 10 and the mobile station apparatuses 20, 30 and 40 configured as above, the scheduling operation will be described.

First, the number of receive antennas notifying signals generated by the number of receive antennas notifying signal generators 210 and 316 of the mobile station apparatuses 20, 30 and 40 are transmitted from the respective mobile station apparatuses. The number of receive antennas notifying signals are received by the antenna 118 of the base station apparatus 10. Then, the radio receiver 120 performs predetermined radio processing (down convert, A/D conversion, etc.), and the number of receive antennas notifying signal decoder 122 decodes the number of receive antennas notifying signals and notifies the number of the receive antennas of each mobile station apparatus to the scheduler 104.

Then, the scheduler 104 performs a scheduling as follows: when transmitting data to the mobile station apparatus 20 the number of whose receive-antennas is one, both of the two transmit antennas 116-1 and 116-2 are assigned the same data addressed to the mobile station apparatus 20, and when transmitting data to the mobile station apparatuses 30 and 40 the number of whose receive antennas is two, the two transmit antennas 116-1 and 116-2 are assigned respective different data sets (that is, two different data sets addressed to the mobile station apparatus 30, two different data sets addressed to the mobile station apparatus 40, or respective data sets addressed to the mobile station apparatuses 30 and 40).

Figure 5:
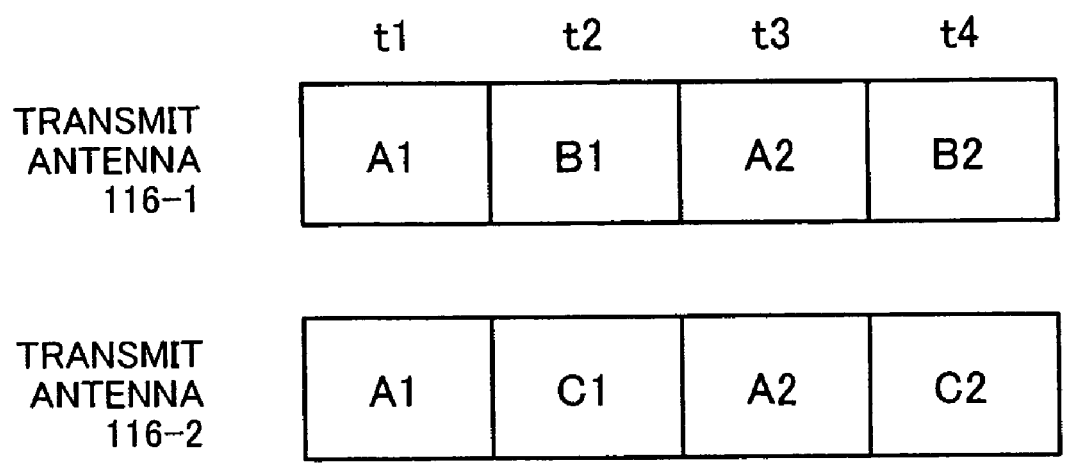
FIG. 5 is a view showing an example of the assignment of data to transmit antennas according to embodiment 1.

Specifically, let the mobile station apparatuses 20, 30, and 40 be user A, user B, and user C respectively. As shown in FIG. 5 for example, the scheduler 104 performs scheduling such that at t1 the two transmit antennas 116-1 and 116-2 are assigned data A1 addressed to user A, at t2 the transmit antennas 116-1 and 116-2 are assigned respectively data B1 addressed to user B and data C1 addressed to user C, and at t3 and t4 they are assigned like at t1 and t2 respectively.

Note that data A1 and A2 being assigned to the two transmit antennas 116-1 and 116-2 at t1 and t3 can be realized by the scheduler 104 controlling the buffer 102 to make a copy of data A1 or A2 and output the data and its copy successively and then by the S/P converter 108 parallel/serial-converting.

Moreover, in the present embodiment a description has been made taking as an example the case where the number of the transmit antennas of the base station apparatus 10 is two, the number of the receive antennas of the mobile station apparatus 20 is one, and the numbers of the receive antennas of the mobile station apparatuses 30 and 40 are two, but these numbers of antennas can be any number. Since the mobile station apparatus can separate the same number of sub-streams as the receive antennas provided thereto, when the base station apparatus has N transmit antennas (that is, can transmit N sub-streams), the scheduling need only be performed such that the same number of different data as the receive antennas of a mobile station apparatus, having the smallest number of receive antennas, from among the mobile station apparatuses as partners to which to transmit data at the same time are assigned to respective ones of the N transmit antennas.

For example, in the case where the base station apparatus has three transmit antennas (can transmit three sub-streams), if one of the mobile station apparatuses as partners to which to transmit data at the same time has two receive antennas, the scheduling is performed such that two different sub-streams are assigned to two of the three transmit antennas, or the two different sub-streams and a copy of one of them are assigned to the three transmit antennas. If all the mobile station apparatuses as partners to which the base station apparatus transmits data at the same time have three or more receive antennas, the scheduling is performed such that three different sub-streams are assigned to the three transmit antennas.

The scheduler 104 notifies information about which transmit antenna is assigned which mobile station apparatus's sub-stream as the scheduling result of the scheduler 104 to the transmit antennas assignment signal generator 124. The transmit antennas assignment signal generator 124 generates a transmit antennas assignment signal for notifying the information about the assignment of the transmit antennas to each mobile station apparatus. The radio transmitter 126 transmits the transmit antennas assignment signal via the antenna 118.

Meanwhile, the scheduler 104 controls the buffer 102, and the encoding section 106 encodes data sent out from the buffer 102 into error-correction coded data. The S/P converter 108 serial/parallel-converts the error-correction coded data into two sub-streams. Then, the modulators 110-1 and 110-2 modulate the sub-streams respectively; the spreading sections 112-1 and 112-2 spread the sub-streams with the same spreading code, and the radio transmitters 114-1 and 114-2 transmit at the same frequency via the transmit antennas 116-1 and 116-2 respectively.

Each mobile station apparatus receives the signals including a sub-stream addressed thereto via the receive antenna 202, 302-1 or 302-2. At the same time, each mobile station apparatus receives the transmit antennas assignment signal via the antenna 214 or 320.

Then, the transmit antennas assignment signal decoder 218 or 324 decodes the transmit antennas assignment signal and notifies information about the assignment of the sub-streams to the transmit antennas in the base station apparatus 10 to the demodulating/decoding section 208 or 312.

For the mobile station apparatus 20, because of receiving signals transmitted with the same sub-stream assigned to the two transmit antennas, the contents of the transmit antennas assignment signal indicates that the two transmit antenna are both assigned the same sub-stream addressed to the mobile station apparatus 20. Meanwhile, for the mobile station apparatuses 30 and 40, only a sub-stream addressed thereto being not necessarily assigned to the two transmit antennas, the contents of the transmit antennas assignment signal indicates which mobile station apparatus's sub-stream out of the two is assigned to each of the first and second transmit antennas.

Based on the contents of the transmit antennas assignment signal, in the mobile station apparatus 20 the demodulating/decoding section 208 demodulates and decodes the sub-stream addressed thereto to obtain reception data. Meanwhile, in the mobile station apparatuses 30 and 40, the sub-stream separating section 308 separates the received signals into the respective data of the sub-streams from the base station apparatus 10, and then the demodulating/decoding section 312 demodulates and decodes the sub-stream addressed thereto to obtain reception data.

As described above, according to the present embodiment, the mobile station apparatus notifies the number of its own receive antennas to the base station apparatus, and when assigning data to a plurality of transmit antennas, the base station apparatus performs scheduling such that the same number of different data as the receive antennas of a mobile station apparatus having the smallest number of receive antennas are transmitted at the same time. Thus, even when a base station apparatus transmits data to different mobile station apparatuses via a plurality of transmit antennas, all the mobile station apparatuses can precisely receive data addressed thereto.

EMBODIMENT 2

The feature of embodiment 2 of the present invention is that each mobile station apparatus reports an index indicating the quality of a channel (CQI: Channel Quality Indicator) to a base station apparatus, and the base station apparatus performs scheduling based on the CQIs and the numbers of receive antennas of the mobile station apparatuses. The radio communication system according to the present embodiment has the same configuration as the radio communication system shown in FIG. 1, thus omitting a description thereof.

Figure 6:
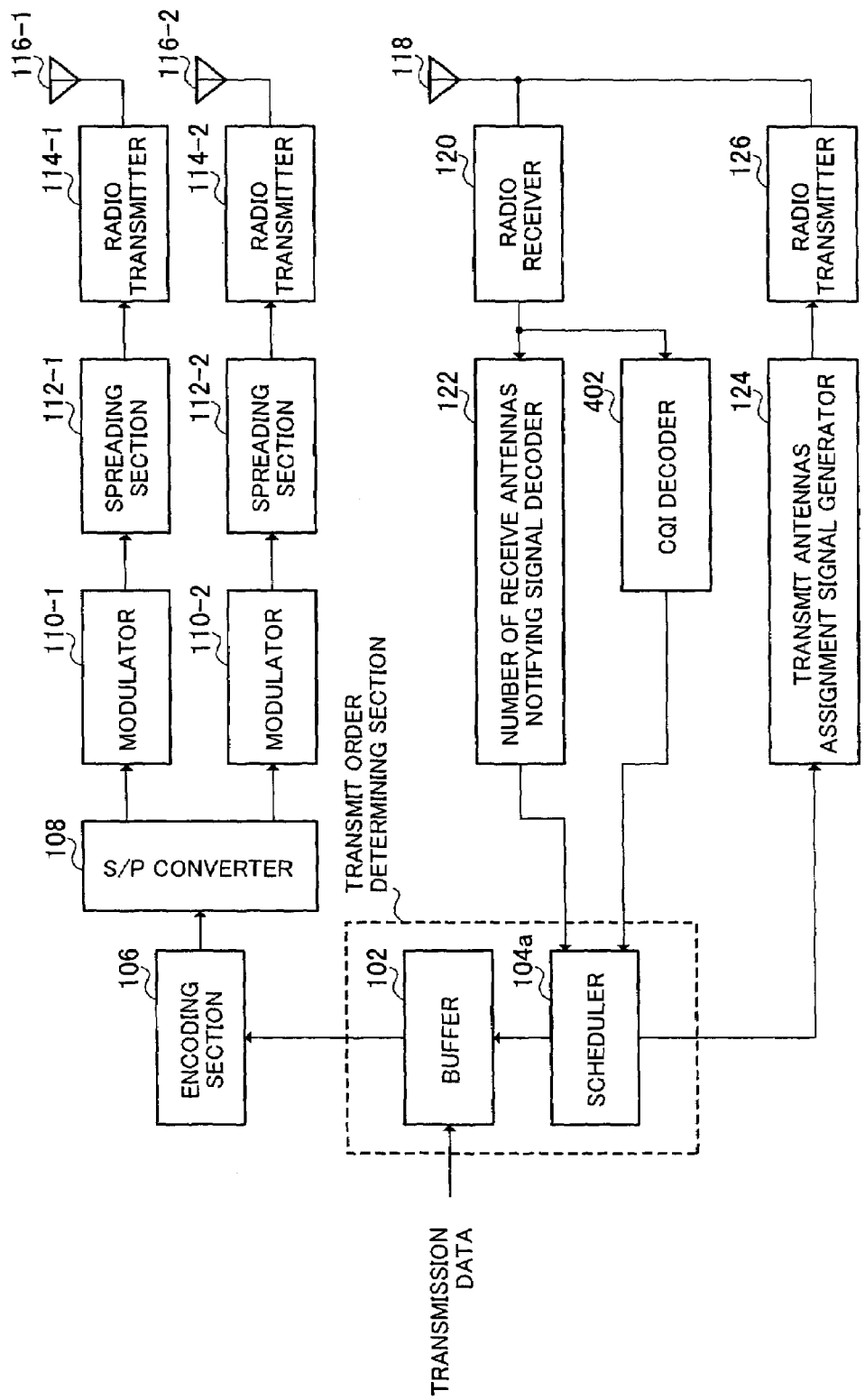
FIG. 6 is a block diagram showing the internal configuration of a base station apparatus according to embodiment 2 of the present invention.

FIG. 6 is a block diagram showing the internal configuration of the base station apparatus according to embodiment 2. The same parts as in the base station apparatus 10 shown in FIG. 2 are indicated by the same reference numerals, and a description thereof is omitted.

The scheduler 104a performs scheduling that determines a data transmit order, depending on the numbers of receive antennas of the respective mobile station apparatuses and CQIs between antennas based on respective number of receive antennas notifying signals decoded by the number of receive antennas notifying signal decoder 122 and the CQIs decoded by a CQI decoder 402. The CQI decoder 402 decodes the CQIs transmitted by the mobile station apparatuses. Here, the CQI is an index indicating the quality of a channel between one of the transmit antenna 116-1 and 116-2 and a receive antenna of a mobile station apparatus, and, for example, CIR (Carrier to Interference Ratio) is used as the CQI.

Figure 7:
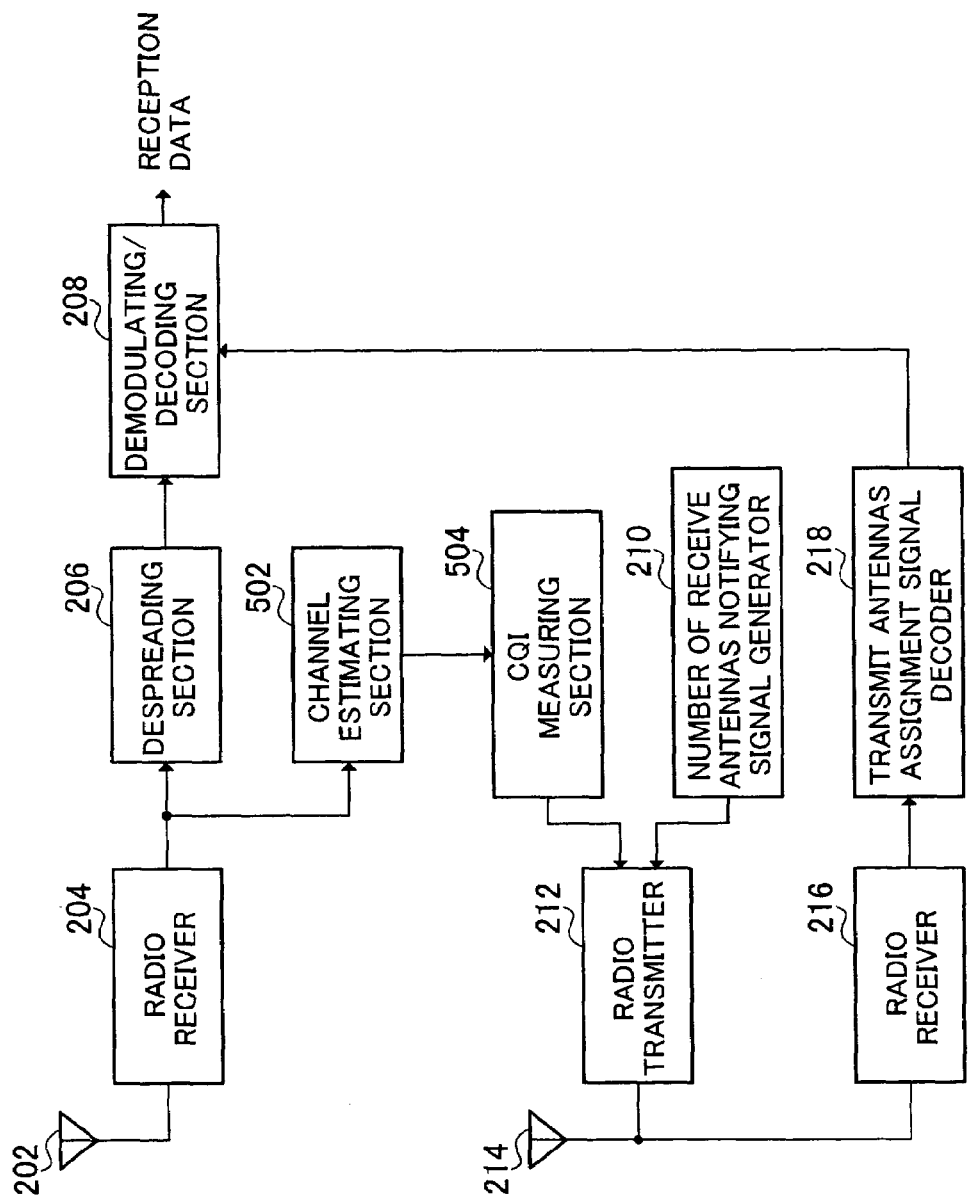
FIG. 7 is a block diagram showing the internal configuration of a mobile station apparatus according to embodiment 2.

FIG. 7 is a block diagram showing the internal configuration of a mobile station apparatus according to embodiment 2. The mobile station apparatus of FIG. 7 has one receive antenna, and the same parts as in the mobile station apparatus 20 shown in FIG. 3 are indicated by the same reference numerals, and a description thereof is omitted.

The channel estimating section 502 performs channel estimation on the signals received by the receive antenna 202. A CQI measuring section 504 measures CQIs between the transmit antenna 116-1 and 116-2 of the base station apparatus and a receive antenna 202 of its own apparatus based on the channel estimation result.

Figure 8:
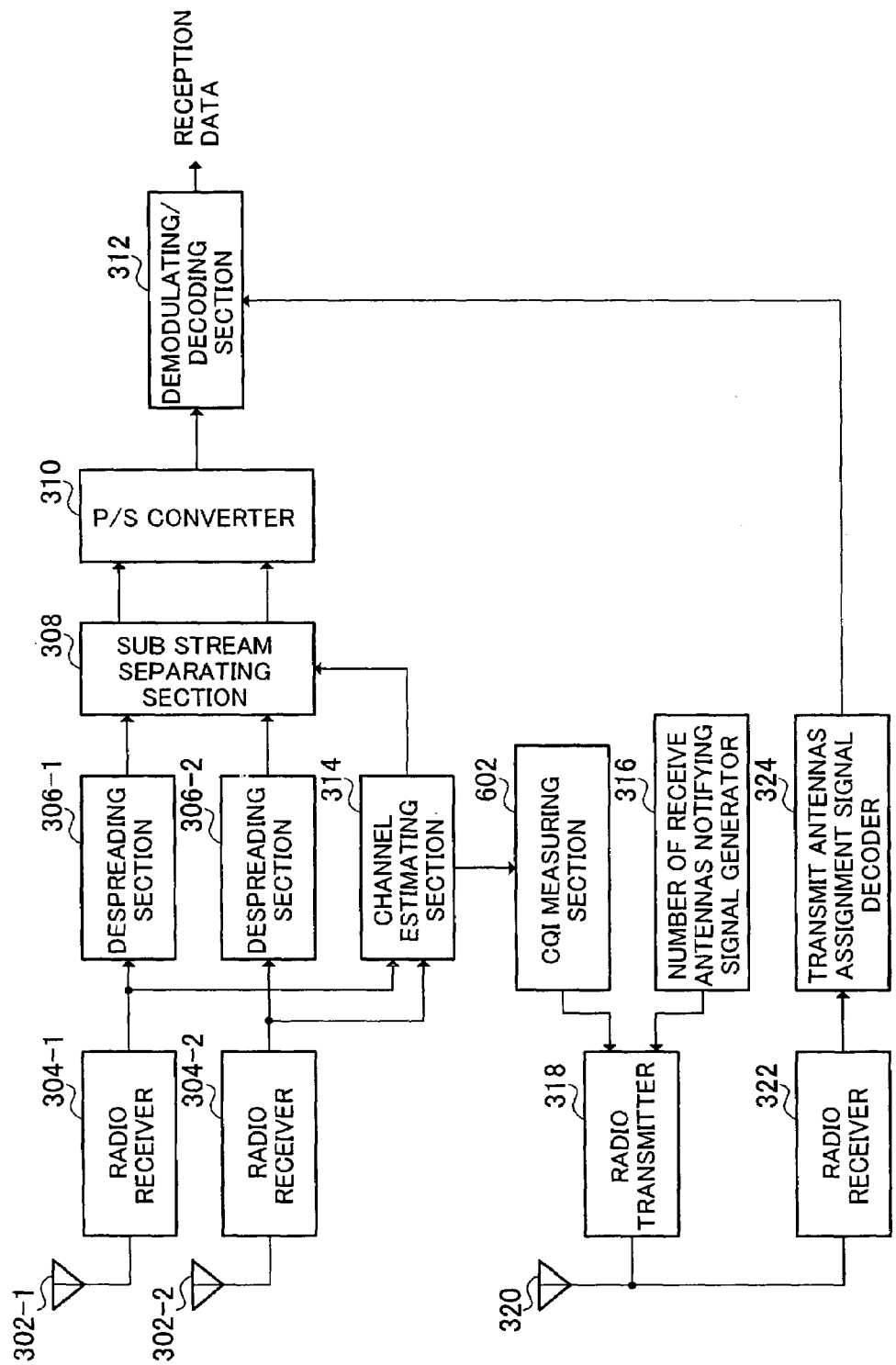
FIG. 8 is a block diagram showing the internal configuration of other mobile station apparatus according to embodiment 2.

FIG. 8 is a block diagram showing the internal configuration of other mobile station apparatuses according to embodiment 2. The mobile station apparatus of FIG. 8 has two receive antenna, and the same parts as in the mobile station apparatus 30 shown in FIG. 4 are indicated by the same reference numerals, and a description thereof is omitted.

A CQI measuring section 602 measures CQIs between the transmit antenna 116-1 and 116-2 of the base station apparatus and receive antennas 302-1 and 302-2 of its own apparatus based on the channel estimation result.

Next, in the radio communication system including the base station apparatus and the mobile station apparatuses configured as above, the scheduling operation will be described.

Also in the present embodiment, first, each mobile station apparatus generates and transmits a number of receive antennas notifying signal to the base station apparatus. At this time, each of the CQI measuring sections 504 and 602 measures CQI for each sub-stream transmitted from the transmit antenna 116-1 and 116-2 of the base station apparatus based on the channel estimation result of the respective channel estimating section 502 or 314, and transmits the measured CQIs and the number of receive antennas notifying signal at the same time.

The CQIs and the number of receive antennas notifying signals are received by the antenna 118 of the base station apparatus. Then, the radio receiver 120 performs predetermined radio processing (down convert, A/D conversion, etc.); the number of receive antennas notifying signal decoder 122 decodes the number of receive antennas notifying signals; the CQI decoder 402 decodes the CQIs; and they notify the number of the receive antennas of each mobile station apparatus and the CQI for each sub-stream to the scheduler 104a.

Then, the scheduler 104a performs scheduling as follows: when transmitting data to the mobile station apparatus the number of whose receive antennas is one, both of the two transmit antennas 116-1 and 116-2 are assigned the same data addressed to the mobile station apparatus, and when transmitting data to the mobile station apparatuses the number of whose receive antennas is two, the two transmit antennas 116-1 and 116-2 are assigned the respective different data sets. Furthermore, data is scheduled to be transmitted on a channel good in quality to each mobile station apparatus based on the CQIs notified by the mobile station apparatus.

Figure 9:
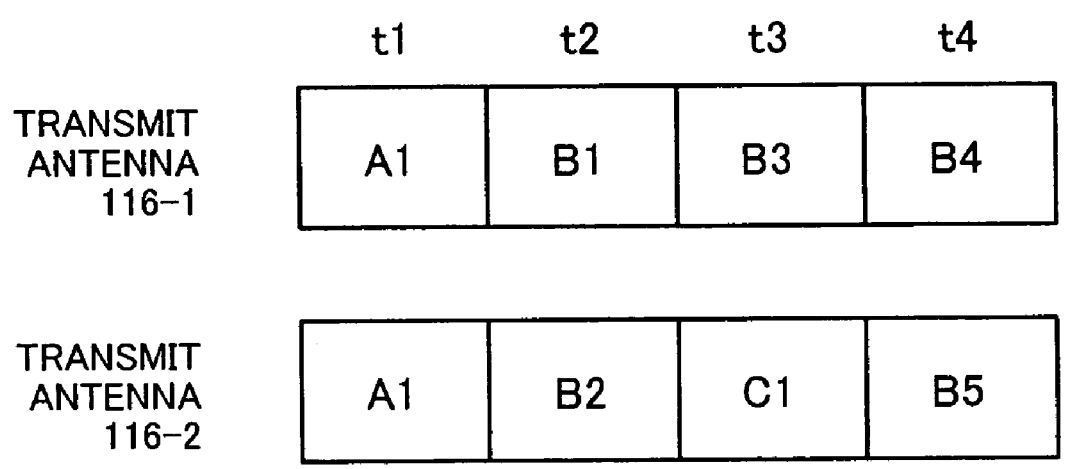
FIG. 9 is a view showing an example of the assignment of data to transmit antennas according to embodiment 2.

Specifically, let the mobile station apparatus having one receive antenna be user A, and the mobile station apparatuses having two receive antenna be user B, and user C. As shown in FIG. 9 for example, the scheduler performs scheduling such that at t1 the two transmit antennas 116-1 and 116-2 are assigned data A1 addressed to user A, at t2 the transmit antennas 116-1 and 116-2 are assigned respectively data B1 and B2 addressed to user B, and at t3 and t4 they are assigned like at t1 and t2. Here, for example, at t3 it is detected from the CQIs that the channel between the transmit antenna 116-1 and a receive antenna of user B and the channel between the transmit antenna 116-2 and a receive antenna of user C are good in quality, and thus the scheduler 104a performs scheduling as shown in FIG. 9.

Note that data A1 being assigned to the two transmit antennas 116-1 and 116-2 at t1 can be realized by the scheduler 104a controlling the buffer 102 to make a copy of data A1 and output the data and its copy successively and then by the S/P converter 108 parallel/serial-converting.

Moreover, in the present embodiment a description has been made taking as an example the case where the number of the transmit antennas of the base station apparatus is two, and the number of the receive antennas of each mobile station apparatuses is one or two, but these numbers of antennas can be any number. Since the mobile station apparatus can separate the same number of sub-streams as the receive antennas provided thereto, when the base station apparatus has N transmit antennas (that is, can transmit N sub-streams), the scheduling need only be performed such that the same number of different data as the receive antennas of a mobile station apparatus, having the smallest number of receive antennas, from among the mobile station apparatuses as partners to which to transmit data at the same time are assigned to respective ones of the N transmit antennas.

Then, as in embodiment 1, the scheduling result is transmitted as the transmit-antennas-assignment signal via the antenna 118, and at the same time data are transmitted respectively via the transmit antennas 116-1 and 116-2 according to the scheduling. Then, each mobile station apparatus demodulates and decodes data addressed thereto based on the transmit antennas assignment signal to obtain reception data.

As described above, according to the present embodiment, each mobile station apparatus reports CQI for each sub-stream to the base station apparatus, and the base station apparatus performs scheduling, depending on the reported CQIs and the numbers of the receive antennas of the respective mobile station apparatuses. Thus, in each mobile station apparatus, quality in receiving data can be improved and wasteful retransmission of data is prevented so that throughput can be improved.

Note that, in the present embodiment, the base station apparatus may adaptively change modulation schemes and error-correction coding schemes by using CQI for each sub-stream reported by the mobile station apparatus. In this case, in the base station apparatus shown in FIG. 6, an encoding section for each sub-stream may be provided after the S/P converter 108 so that the encoding and modulation sections for each sub-stream adaptively perform error-correction coding and modulation.

EMBODIMENT 3

The feature of embodiment 3 of the present invention is that in communications of an OFDM (Orthogonal Frequency Division Multiple) scheme or an MC-CDMA (Multi Carrier-Code Division Multiple Access) scheme, each mobile station apparatus notifies the number of receive antennas thereof to a base station apparatus. The radio communication system according to the present embodiment has the same configuration as the radio communication system shown in FIG. 1, hence omitting a description thereof.

Figure 10:
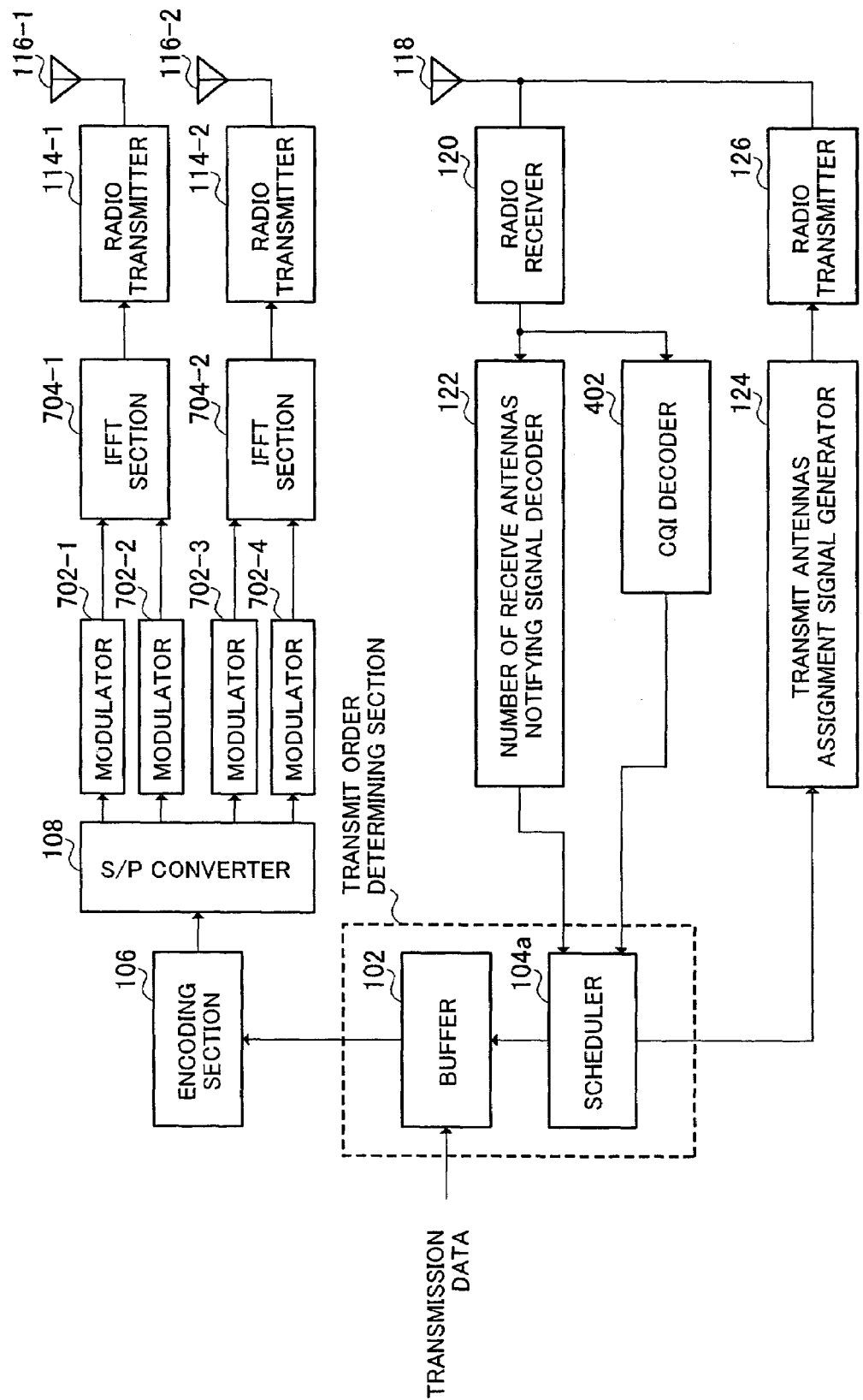
FIG. 10 is a block diagram showing the internal configuration of a base station apparatus according to embodiment 3 of the present invention.

FIG. 10 is a block diagram showing the internal configuration of the base station apparatus according to embodiment 3. The same parts as in the base station apparatus shown in FIG. 6 are indicated by the same reference numerals, and a description thereof is omitted.

The CQI decoder 402 decodes the CQIs transmitted by the mobile station apparatuses. Modulators 702-1 to 702-4 modulate respective data of subcarriers obtained by serial/parallel-conversion. IFFT (Inverse Fast Fourier Transform) sections 704-1 to 704-2 each perform inverse fast Fourier transform on data of two subcarriers as a unit. While in the present embodiment a description will be made assuming that one sub-stream includes data of two subcarriers, the number of subcarriers included in each sub-stream can be any.

Figure 11:
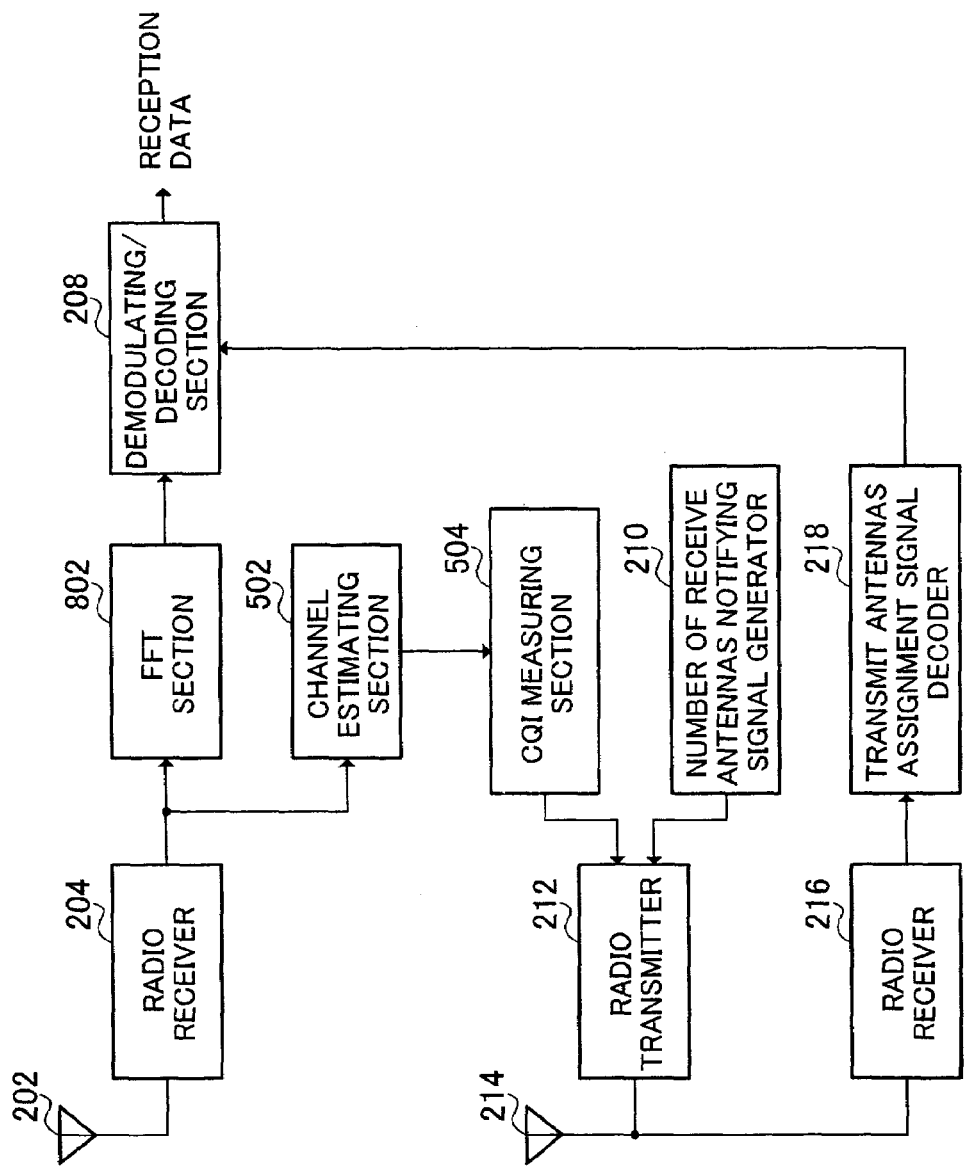
FIG. 11 is a block diagram showing the internal configuration of a mobile station apparatus according to embodiment 3.

FIG. 11 is a block diagram showing the internal configuration of a mobile station apparatus according to embodiment 3. The mobile station apparatus shown in FIG. 11 has one receive antenna, and the same parts as in the mobile station apparatus shown in FIG. 7 are indicated by the same reference numerals, and a description thereof is omitted.

An FFT (Fast Fourier Transform) section 802 fast-Fourier-transforms the signals received by the receive antenna 202.

Figure 12:
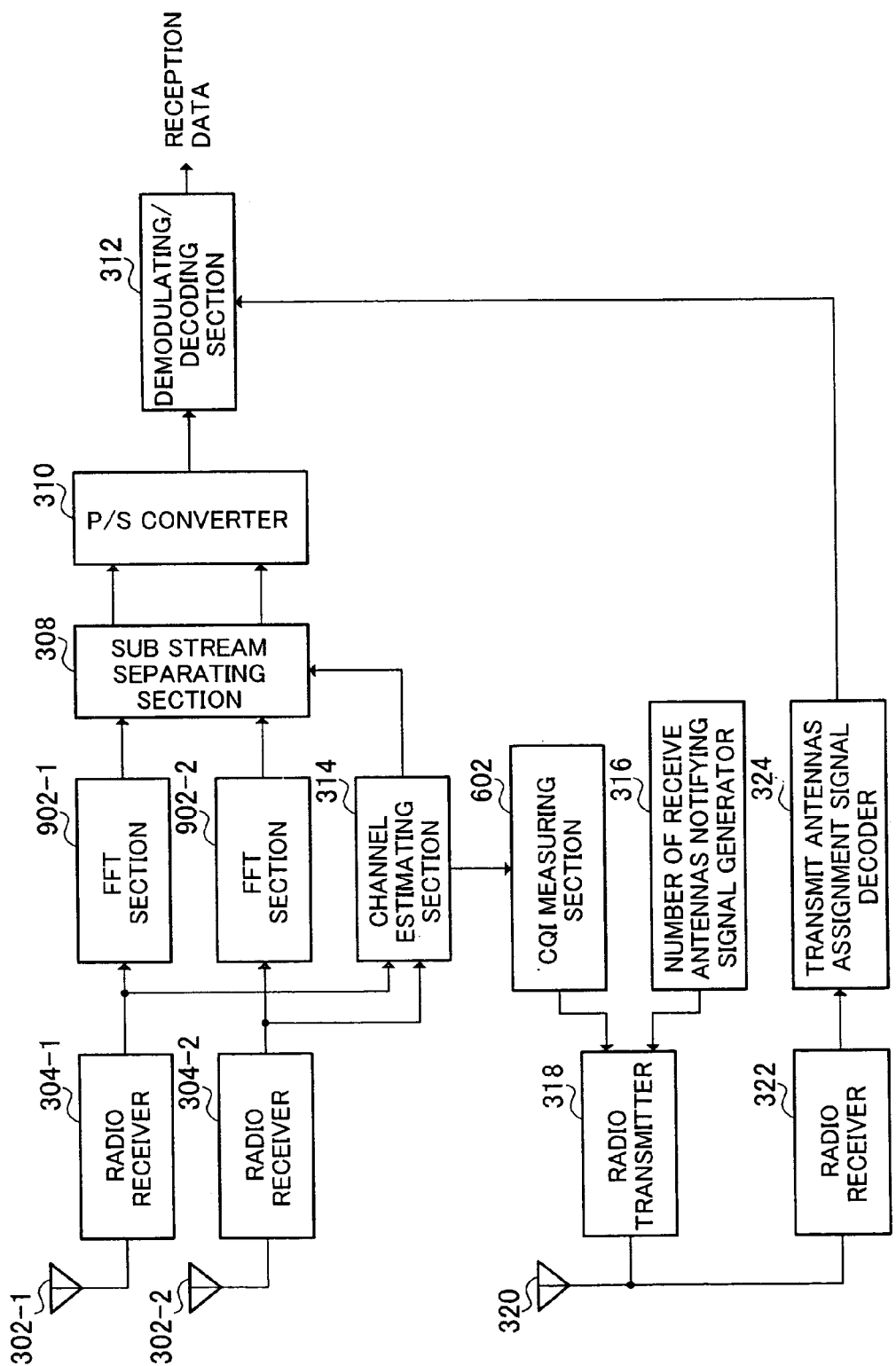
FIG. 12 is a block diagram showing the internal configuration of other mobile station apparatus according to embodiment 3.

FIG. 12 is a block diagram showing the internal configuration of other mobile station apparatuses according to embodiment 3. The mobile station apparatus shown in FIG. 12 has two receive antenna, and the same parts as in the mobile station apparatus shown in FIG. 8 are indicated by the same reference numerals, and a description thereof is omitted.

FFT sections 902-1 to 902-2 fast-Fourier-transforms the signals received by the receive antennas 302-1 to 302-2 respectively.

Next, in the radio communication system including the base station apparatus and the mobile station apparatuses configured as above, the scheduling operation will be described.

Also in the present embodiment, first, the number of receive antennas notifying signal is generated and transmitted from each mobile station apparatus to the base station apparatus. At this time, each of the CQI measuring sections 504 and 602 measures CQIs of respective sub-streams transmitted from the transmit antenna 116-1 and 116-2 of the base station apparatus based on channel estimation result of the channel estimating section 502 or 314, and the measure CQIs are transmitted at the same time as the number of receive antennas notifying signal.

The number of receive antennas notifying signals and the CQIs are received by the antenna 118 of the base station apparatus. Then, the radio receiver 120 performs predetermined radio processing (down convert, A/D conversion, etc.), and the number of receive antennas notifying signal decoder 122 decodes the number of receive antennas notifying signals and the CQI decoder 402 decodes the CQIs to notify the number of the receive antennas of each mobile station apparatus and the CQI of each sub-stream to the scheduler 104a.

Then, the scheduler 104a performs scheduling as follows: when transmitting data to the mobile station apparatus the number of whose receive antennas is one, both of the two transmit antennas 116-1 and 116-2 are assigned the same data addressed to the mobile station apparatus, and when transmitting data to the mobile station apparatuses the number of whose receive-antennas is two, the two transmit antennas 116-1 and 116-2 are assigned the respective different data sets. Furthermore, data is scheduled to be transmitted on a channel good in quality to each mobile station apparatus based on the CQIs notified by the mobile station apparatus. Yet further, the scheduler 104a performs scheduling as follows: when transmitting data to the mobile station apparatus the number of whose receive antennas is one, the same data is superimposed on subcarriers of the same frequency in the respective sub-streams, and when transmitting data to the mobile station apparatuses the number of whose receive antennas is two, different data are respectively superimposed on subcarriers of the same frequency in the respective sub-streams.

Specifically, let the mobile station apparatus having one receive antenna be user A, and the mobile station apparatuses having two receive antenna be user B, and user C. As shown in FIG. 13 for example, the scheduler performs scheduling as follows: at t1 the subcarriers of frequency f1 in the respective sub-streams transmitted from the two transmit antennas 116-1 and 116-2 are assigned data A1 addressed to user A, and the subcarriers of frequency f2 are assigned data A2 addressed to user A; at t2 the subcarrier of frequency f1 in the sub-stream transmitted from the transmit antenna 116-1 is assigned data B1 addressed to user B, the subcarrier of frequency f2 is assigned data C1 addressed to user C, the subcarrier of frequency f1 in the sub-stream transmitted from the transmit antenna 116-2 is assigned data B2 addressed to user B, the subcarrier of frequency f2 is assigned data B3 addressed to user B; and at t3 and t4 they are assigned like at t1 and t2.

Note that data A1 and A2 being assigned to the two transmit antennas 116-1 and 116-2 at t1 can be realized by the scheduler 104a controlling the buffer 102 to make copies of data A1 and A2 and output data A1, A2, A1 (copy), and A2 (copy) in that order and then by the S/P converter 108 parallel/serial-converting.

Moreover, in the present embodiment a description has been made taking as an example the case where the number of the transmit antennas of the base station apparatus is two, and the number of the receive antennas of each mobile station apparatuses is one or two, but these numbers of antennas can be any number. Since the mobile station apparatus can separate the same number of sub-streams as the receive antennas provided thereto, when the base station apparatus has N transmit antennas (that is, can transmit N sub-streams), the scheduling need only be performed such that the same number of different data as the receive antennas of a mobile station apparatus, having the smallest number of receive antennas, from among the mobile station apparatuses as partners to which to transmit data at the same time are assigned to respective ones of the N transmit antennas.

Then, as in embodiment 1, the scheduling result is transmitted as the transmit antennas assignment signal via the antenna 118, and at the same time data are transmitted respectively via the transmit antennas 116-1 and 116-2 according to the scheduling. Then, each mobile station apparatus fast-Fourier-transforms the received signals, and demodulates and decodes data addressed thereto based on the transmit antennas assignment signal to obtain reception data.

As described above, according to the present embodiment, in communications using the OFDM scheme or the MC-CDMA scheme, even in the case where a base station apparatus transmits data to different mobile station apparatuses respectively via a plurality of transmit antennas, all the mobile station apparatuses can precisely receive data addressed thereto.

As described above, according to the present invention, in the case where data are transmitted to different receive apparatuses respectively via a plurality of transmit antennas, all the receive apparatuses can precisely receive data addressed thereto.

The present description is based on Japanese Patent Application No. 2002-179818 filed on Jun. 20, 2002, which is herein incorporated by reference.

INDUSTRIAL APPLICABILITY

The present invention can be applied to a radio communication system and a scheduling method.

What is claimed is:

1. A radio communication system that has a mobile station apparatus group of which at least one mobile station apparatus is provided with a plurality of receive antennas and a base station apparatus that transmits data to said mobile station apparatus group via a plurality of transmit antennas, wherein:

each mobile station apparatus of said mobile station apparatus group comprises:

a number of receive antennas notifying signal transmit section that transmits a number of receive antennas notifying signal indicating the number of receive antennas provided for the mobile station apparatus; and said base station apparatus comprises:

a number of receive antennas notifying signal receive section that receives said number of receive antennas notifying signals;

a transmit order determining section that determines order in which data are transmitted based on said number of receive antennas notifying signals received; and a data transmit section that assigns the data to said plurality of transmit antennas according to the determined transmit order and transmits.

2. The radio communication system according to claim 1, wherein said base station apparatus further comprises:
- a transmit antennas assignment signal transmit section that transmits a transmit antennas assignment signal for notifying assignment of data to said plurality of transmit antennas, which assignment is set by said data transmit section.

3. The radio communication system according to claim 1, wherein said transmit order determining section determines a transmit order so as to transmit the same number of different data as the receive antennas of a mobile station apparatus, having the smallest number of receive antennas, from among mobile station apparatuses as partners to which to transmit data simultaneously via said plurality of transmit antennas.

4. The radio communication system according to claim 1, wherein:
- each mobile station apparatus of said mobile station apparatus group further comprises:
- a link quality measuring section that measures link qualities between the plurality of transmit antennas of said base station apparatus and receive antennas of the mobile station apparatus; and
- a link quality information transmit section that transmits information about the measured link qualities; and
- said base station apparatus further comprises:
- a link quality information receive section that receives the link quality information,
- wherein said transmit order determining section determines order in which data are transmitted based on the link quality information and the number of receive antennas notifying signals received.

5. A base station apparatus that transmits data via a plurality of transmit antennas, comprising:
- a number of receive antennas notifying signal receive section that receives number of receive antennas notifying signals indicating the numbers of receive antennas provided for communication partner stations;
- a transmit order determining section that determines order in which data are transmitted based on said number of receive antennas notifying signals received; and
- a data transmit section that assigns the data to said plurality of transmit antennas according to the determined transmit order and transmits.

6. The base station apparatus according to claim 5, further comprising:
- a transmit antennas assignment signal transmit section that transmits a transmit antennas assignment signal for notifying assignment of data to said plurality of transmit antennas, which assignment is set by said data transmit section.

7. The base station apparatus according to claim 5, wherein said transmit order determining section determines a transmit order so as to transmit the same number of different data as the receive antennas of a communication partner station, having the smallest number of receive antennas, from among communication partner stations to which to transmit data simultaneously via said plurality of transmit antennas.

8. The base station apparatus according to claim 5, further comprising:
- a link quality information receive section that receives link quality information indicating link qualities between said plurality of transmit antennas and receive antennas of communication partner stations,
- wherein said transmit order determining section determines order in which data are transmitted based on the link quality information and the number of receive antennas notifying signals received.

9. The base station apparatus according to claim 8, wherein said data transmit section changes modulation schemes and encoding schemes for data assigned to said plurality of transmit antennas, adaptively depending on said link quality information and transmits.

10. The base station apparatus according to claim 5, wherein said data transmit section superimposes data assigned respectively to said plurality of antennas on a plurality of carriers and transmits.

11. A mobile station apparatus that communicates with the base station apparatus according to claim 5, the mobile station apparatus comprising:
- a number of receive antennas notifying signal transmit section that transmits a number of receive antennas notifying signal indicating the number of receive antennas provided for the mobile station apparatus to said base station apparatus.

12. A scheduling method comprising the steps of:
- acquiring the numbers of receive antennas of communication partner stations;
- determining order in which data are transmitted based on the acquired numbers of the receive antennas; and
- assigning the data to a plurality of transmit antennas according to the determined transmit order and transmitting.

* * * * *